Jan. 10, 1961  C. S. BROWN  2,967,699
LIQUID-GAS CONTACT APPARATUS
Filed Nov. 7, 1958  3 Sheets-Sheet 1

INVENTOR.
CARL S. BROWN
BY *Andrus & Starke*
Attorneys

INVENTOR.
CARL S. BROWN

United States Patent Office 2,967,699
Patented Jan. 10, 1961

2,967,699
LIQUID-GAS CONTACT APPARATUS
Carl S. Brown, Pepper Pike, Ohio, assignor to A. O. Smith Corporation, Milwaukee, Wis., a corporation of New York Filed Nov. 7, 1958, Ser. No. 772,625
8 Claims. (Cl. 261—114)

This invention relates to a liquid-gas contact apparatus.

In the conventonal liquid-gas contact apparatus, the gas is introduced into a lower end of a vertical column and passes upwardly through the liquid which is descending within the column. The column is generally provided with a baffling arrangement, such as a series of trays or plates, to increase the contact between the liquid and the gas.

The present invention is directed to a liquid-gas contact apparatus for use with corrosive materials in which all of the internal surfaces are constructed of corrosion resistant material to substantially eliminate contamination of the fluids passing within the column.

According to the invention, the column comprises a series of generally cylindrical sections which are connected in an end-to-end relation and are enclosed at the top and bottom by suitable heads. The internal surfaces of both the cylinder sections and the heads are coated with vitreous enamel or glass to prevent corrosion of these surfaces by the fluids passing through the column.

A series of sieve plates provide increased contact between the liquid and gas and are disposed in spaced relation within each of the column sections. The plates in each column section are supported by a ring which is located between the ends of adjacent sections, and each plate is spaced from adjacent plates by a series of pins which are removably secured in end-to-end relation. The fluids pass through holes in the plates, and the holes are of a size and spacing to maintain a level of liquid on the upper surface of each plate. The liquid level is maintained at a given height on each plate by a downcomer which is disposed in an opening in the plate and extends downwardly to the next succeeding plate, and liquid above the given level is conducted by the downcomer to the next lower plate. The upper end of each of the downcomers is provided with a pair of outwardly extending arms to increase the effectiveness of the baffling arrangement.

As all of the internal surfaces of the cylindrical sections and heads are glass coated and as all of the other elements, such as the sieve plates, downcomers, gaskets, etc., are constructed of corrosion resistant materials, such as glass or plastic, contamination of the fluids is prevented. Furthermore, each cylindrical section can be pre-assembled with the downcomers and plates so that the entire column can be readily fabricated by connecting the pre-assembled sections together.

The plate and downcomer construction of the present invention provides an improved contact between the liquid and the gas in that the gas and liquid are made to flow in a fixed path through the openings within the plates to provide a more effective contact action.

Other objects and advantages will appear in the course of the following description.

The drawings illustrate the best mode presently contemplated of carrying out the invention.

Figure 1:
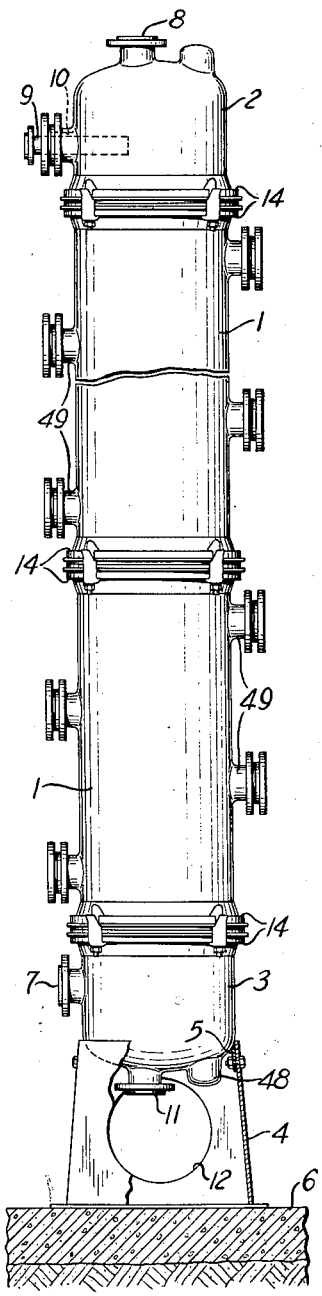
Figure 1 is a side elevation of the liquid-gas contact column of the invention.

The drawings illustrate a liquid-gas contact apparatus comprising a plurality of generally cylindrical sections 1 which are clamped together in an end-to-end relation. The top of the column is closed off by a top head 2 while the bottom of the column is enclosed by a bottom head 3.

The column is supported on a generally skirt-shaped base 4 which is attached to the lower head 3 by suitable bolts extending through clips 5 attached to the bottom head. The base 4 rests on a foundation 6 or the like.

Gas is introduced into the column through an opening 7 provided in the bottom head 3 and passes upwardly through the column and is discharged through the generally axial opening 8 formed in head 2. The liquid is introduced into the upper end of the column through the dip tube 9 secured within the flanged opening 10 in upper head 2. The liquid passes downwardly through the column and is discharged from the outlet 11 in the lower end of bottom head 3.

To provide access to the bottom of the column, the base 4 is provided with a pair of generally circular access openings 12.

To prevent corrosion of the internal surfaces of the column by the fluids passing therethrough, the inner surfaces of the column sections 1 and the heads 2 and 3 are coated with a glass composition 13 or vitreous enamel. The glass is a conventional type generally applied to the particular base metal from which the sections are fabricated and serves not only to withstand corrosion from the fluids passing within the column, but also provides a smooth surface and facilitates cleaning of the column sections 1.

Figure 4:
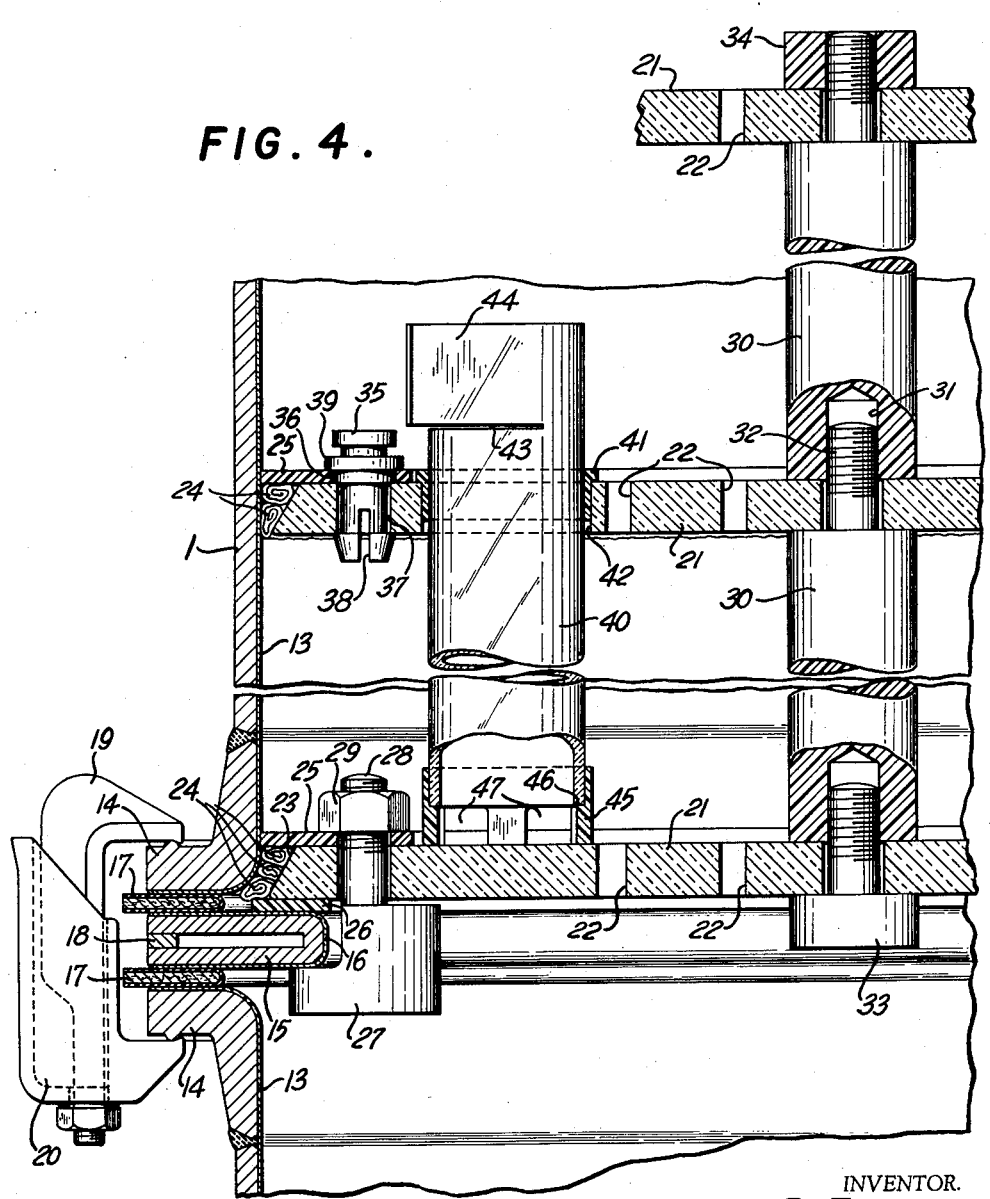
Fig. 4 is an enlarged fragmentary vertical section taken along line 4—4 of Fig. 3.

To connect the column sections 1 together, each end of the sections is provided with an outwardly extending flange 14 and a ring 15 is disposed between the adjacent flanges 14 of the sections 1 and projects inwardly beyond the internal diameter of the sections 1. The ring 15 has a generally U-shaped cross section and the outer surface of the ring is provided with a glass coating 16 similar to the glass coating 13 on the column sections 1. As best shown in Fig. 4, the glass coating 13 extends over the internal surfaces of the flanges 14, and a pair of corrosion resistant, plastic covered gaskets 17 made of asbestos or the like are disposed between the rings 15 and the adjacent flanges 14 to prevent glass-to-glass contact. The outer open end of the supporting ring 15 is provided with a spacer ring 18 which maintains the arms or flanges of the ring 15 in proper spaced relation and prevents the ring from collapsing.

The column sections 1 are secured together by a plurality of clamps which are disposed in spaced relation around the periphery of the column and engage the outwardly extending flanges 14. Each clamp includes an upper jaw member 19 and a lower jaw member 20, and the upper jaw member 19 is provided with a threaded stem which extends through an opening in lower jaw member 20 and is engaged by a suitable nut. By threading the nut onto the stem, the jaw members are forced together to clamp the flanges 14 therebetween.

Each support ring 15 supports a series of generally circular, glass, sieve plates 21 which are disposed in spaced relation within each of the column sections 1. Each plate 21 is provided with a series of spaced holes 22 through which the liquid is adapted to pass downwardly with a rain-like effect and through which the gas is adapted to pass upwardly.

The plates 21 are provided with beveled edges 23 which are spaced inwardly out of contact with the glass coating 13 on the column sections 1. The space between the peripheral edge of the plates 21 and the column sections 1 is sealed by glass rope packing 24 which is wedged within the space. The rope packing 24 is retained within the space by a plastic ring 25 which rests on the upper surface of the plate 21. The ring 25 serves to prevent the packing from being displaced upwardly in the event a surge of pressure acts upwardly on the rope packing.

The lowermost plate 21, in each section, is spaced from the supporting ring 15 by a gasket 26 made from Teflon or other corrosion resistant plastic material to prevent glass-to-glass contact.

The lowermost plate 21, in each section, is clamped to the supporting ring 15 by a series of plastic clamps 27. The clamps 27 include a threaded stud 28 which extends upwardly through a suitable opening in the respective plate 21 and ring 25. The upper end of each stud 28 is engaged by a plastic nut 29 to thereby firmly secure the lowermost plate 21 to the supporting ring 15.

The upper plates 21 in each column section 1 are supported from the lowermost plate in each section by a series of pins 30 which extend between the respective plates. The lower end of each pin 30 rests on the respective plate 21 and is provided with a threaded recess 31. The recess 31 threadedly receives a stud 32 formed on the upper end of the adjacent pin and which extends through a suitable opening in the plate. A screw 33 is threadedly engaged within the threaded recess 31 in the lowermost pin to secure the lowermost plate to the pin, and a plastic nut 34 threadedly engages the stud 32 of the uppermost pin which extends through the opening in the uppermost plate 21. The pins 30 serve to space the plates 21 in vertical relation and also support the plates and prevent relative rotation therebetween.

The clamps 27 serve to secure the plastic ring 25 to the lowermost plate 21 in the column section. However, the rings 25 associated with the upper plates in the column section are secured to the respective plates 21 by a plurality of plugs 35 which extend through key hole shaped openings 36 in ring 25 and a generally cylindrical opening 37 in the plate. The lower ends of the plastic plugs 35 are split, as indicated at 38, to provide an expandable end, while the upper ends of the plugs are provided with enlarged heads 39. When the plug is inserted within the openings 36 and 37, the lower end of the plug will expand to force the ring 25 and plate 21 against the head 39. Plastic filler dowels may be driven into the split 38 to lock the lower ends of the plugs in the expanded position.

The key hole shaped openings 36 in the ring 25 provide a locking arrangement for the ring and permit the ring to be readily removed from the plug by rotating the ring until the larger ends of the openings 36 are in alignment with the plugs 35.

The holes 22 in the plates 21 are constructed with a size and number to provide a liquid level on the upper surface of each plate and insure that the gas passing upwardly through the holes must also pass through the level of liquid standing on the plates. To control the level of the liquid on each plate, a series of downcomers 40 are employed which conduct the liquid from one plate level to the next succeeding lower plate level and maintain a given liquid level on each plate. The downcomers 40 are disposed within plastic bushings 41 secured within openings 42 in the plates 21. The upper end of each downcomer is provided with a slit 43 and the upper portion of each downcomer, above the location of the slit 43, is bent outwardly to provide a pair of arms 44 which face toward the periphery of the column. The height of the slit 43 above the level of the corresponding plate 21 determines the liquid level on the plate and whenever the liquid level rises above the level of slit 43, the excess liquid will then drain through the downcomer to the next lower plate.

The outwardly extending arms 44 serve to increase the baffling effect of the liquid and provide increased contact between the liquid and gas.

The lower end of each downcomer 40 is supported in a shoe 45 which rests on the next lower plate 21. The shoe 45 is provided with an internal shoulder 46 which is engaged by the lower end of the downcomer 40 and spaces the downcomer above the level of the plate. To permit the liquid passing downwardly within the downcomer to drain, the bottom edge of each shoe 45 is provided with a plurality of notches 47 through which the liquid can be discharged from the downcomer.

Figure 2:
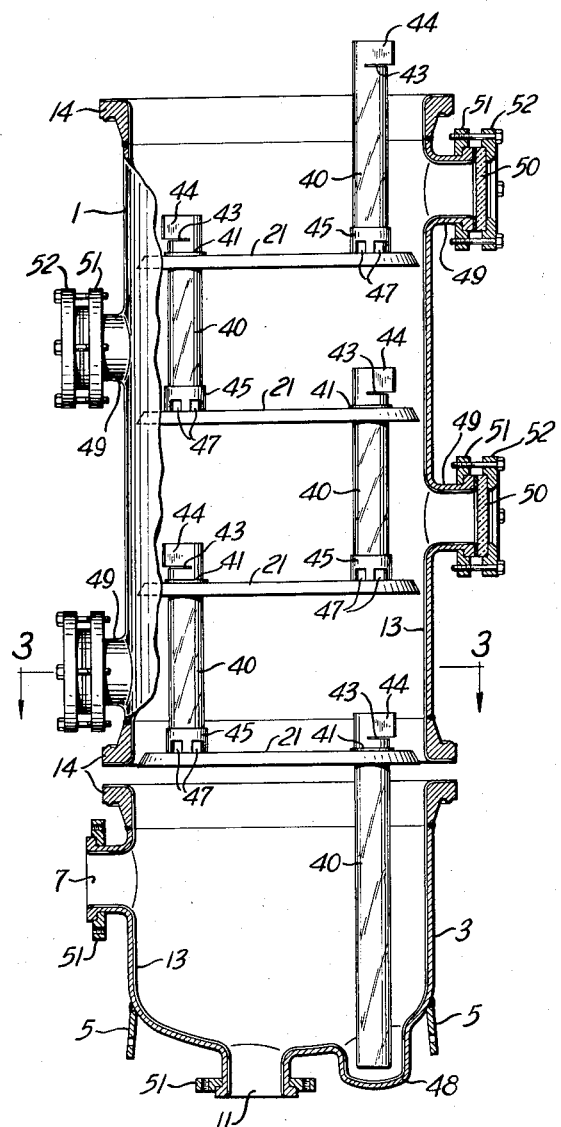
Fig. 2 is an enlarged fragmentary side elevation of the column with parts broken away in section.
Figure 3:
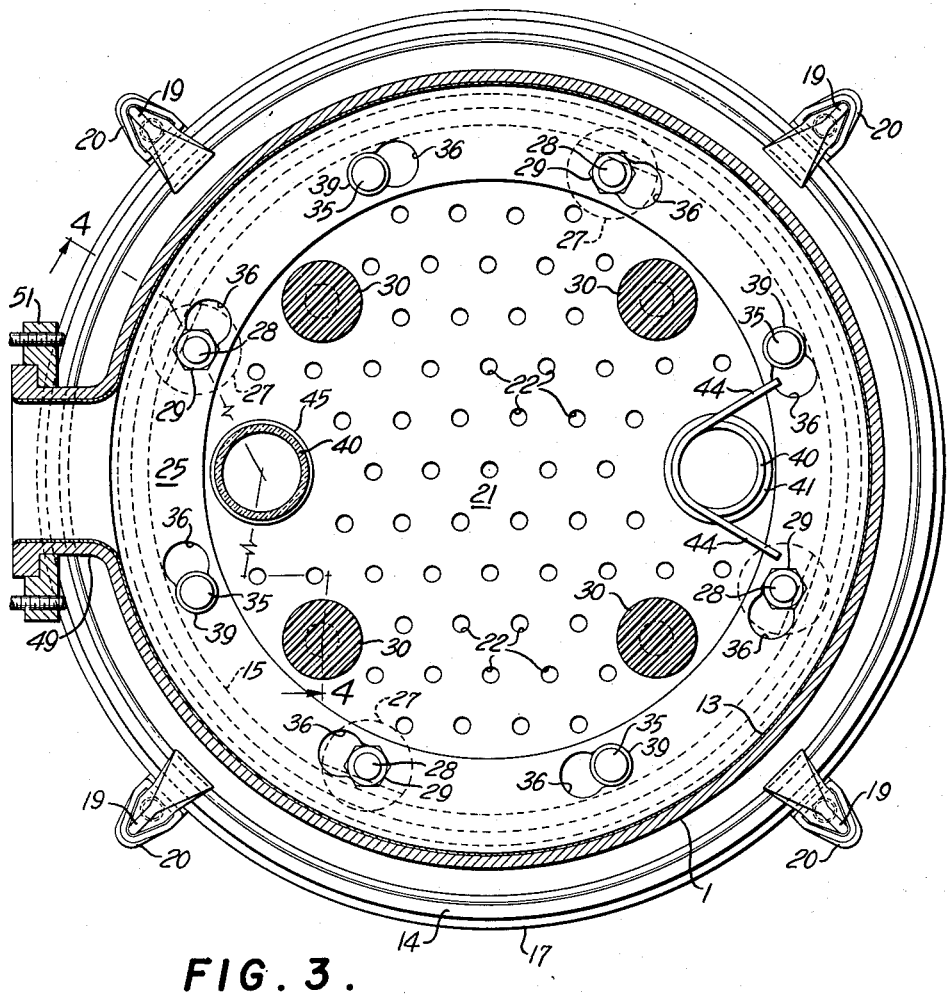
Fig. 3 is a transverse section taken along line 3—3 of Fig. 2.

As best shown in Fig. 2, the downcomer 40, which is associated with the lowermost plate in the lowermost column section, extends downwardly into a sump 48 provided in the lower head 3. A liquid level is maintained in the sump and the lower end of the downcomer extends beneath the liquid level to provide a liquid seal and prevent the gas from passing upwardly within the downcomer.

In order to observe the process within the column, each column section 1 is provided with a plurality of flanged openings 49 which are closed off by glass or plastic discs 50. The discs are secured across the openings 49 by means of a pair of clamping rings 51 and 52 which are secured together by suitable bolts.

As in the case of the gas and liquid inlets and outlets and the flanges 14, the flanged outlets 49 are also coated wtih the glass or vitreous enamel 13 to prevent corrosion of these areas of the column.

In operation of the apparatus, the gas is introduced into the column through opening 7 and simultaneously, the liquid is introduced into the column through dip tube 9. The liquid passes downwardly by gravity and flows like rain through the openings 22 in the plates 21 to each succeeding plate. As previously pointed out, the holes are formed with a size and number such that the liquid will not fall freely through the holes but a liquid level will be built up on each plate 21. The downcomers control the liquid level on each plate and serve to conduct the overflow liquid downwardly to the next succeeding plate.

The gas passing upwardly within the column is forced to pass through the openings 22 in each plate and thereby passes through the liquid level maintained on each plate to provide intimate contact with the liquid.

As none of the internal structure of the column, such as the plates, downcomers, etc., are permanently attached to the column sections 1, the column can be easily dismantled or assembled and can be readily cleaned. Furthermore, each column section is substantially independent and can be pre-assembled. This enables the entire column to be assembled very rapidly by merely connecting the pre-assembled column sections together in an end-to-end relation.

As all of the internal surfaces of the column sections 1, the plates 21, downcomers 40, retaining rings 15, etc., are either coated with a corrosion resistant material or are made from a plastic material which will withstand corrosion, there will be no contamination of the fluids passing within the column by virtue of the materials from which the column is constructed. This insures that the fluids will remain in a pure state and increases the effectiveness of the process.

Various modes of carrying out the invention are contemplated as being within the scope of the following claims particularly pointing out and distinctly claiming the subject matter which is regarded as the invention.

I claim

1. In a liquid-gas contact apparatus, a plurality of generally cylindrical sections disposed in and end-to-end relation, a glass coating covering the internal surfaces of each of the sections, a ring disposed between the adjacent ends of the sections and projecting inwardly beyond the internal diameter of the sections to provide a seat, a series of corrosion resistant perforated plates disposed in spaced relation within said sections with the lowermost plate in any one section being supported by the ring located between said section and the next lower section, means for supporting the remaining plates in any one section from said lowermost plate, the peripheral edge of said plates being spaced out of contact with the glass coating covering the internal surfaces of said sections to provide a clearance therebetween, and a corrosion resistant seal disposed within said clearance to prevent flow of liquid and gas therethrough.

2. In a liquid-gas contact apparatus, a plurality of tubular sections disposed in end-to-end relation with the ends of the sections having outwardly extending flanges, a glass coating covering the internal surfaces of said sections and said flanges, an annular support member disposed between the adjacent flanges of said sections and extending inwardly beyond the internal diameter of said sections to provide a seat, a glass coating covering the surfaces of said support member, a corrosion resistant gasket member disposed between the support member and the respective flanges of said sections to prevent glass-to-glass contact between the flanges and said support member, clamping means engageable with the flanges of adjacent sections and disposed on the exterior of said sections for clamping said sections together, and a series of contact members disposed in spaced relation within each section and supported by said annular support member and free of attachment to the walls of the respective column sections, said contact members serving to increase the contact between the liquid and gas passing through said column sections.

3. In a liquid-gas contact apparatus, a tubular section, a ridge disposed on an internal surface of said section and extending inwardly beyond the internal diameter of said section to provide a seat, a glass coating covering the internal surfaces of said section and covering said ridge, a series of sieve plates disposed in spaced relation within the section with the lowermost plate in said series resting on said ridge, supporting means for supporting the remaining plates in the series in spaced relation from said lowermost plate, said plates having a plurality of holes of a size and spacing to provide a liquid level on each plate under normal fluid flow conditions through said tubular section, a tubular downcomer disposed within an opening in the plate and having the upper end thereof projecting a given distance above said plate and the lower end thereof extending downwardly toward the next succeeding lower plate, and a corrosion resistant shoe resting on the upper surface of said lower plate and disposed to space the lower end of said downcomer from said lower plate to thereby provide communication between the interior of the downcomer and the area above said lower plate.

4. The structure of claim 1, with the further addition of retaining means secured to the plates for preventing displacement of the seal from said clearance.

5. The structure of claim 1, in which said plates are glass and said seal is glass yarn.

6. In a liquid-gas contact apparatus, a plurality of tubular sections disposed in end-to-end relation with the ends of the sections having outwardly extending flanges, a glass coating covering the internal surfaces of said sections and said flanges, an annular support member disposed between the adjacent flanges of said sections and extending inwardly beyond the internal diameter of said sections to provide a seat, a glass coating covering the external surfaces of said support member, a corrosion resistant gasket member disposed between the support member and the respective flanges of said sections to prevent glass-to-glass contact between the flanges and said support member, a series of corrosion resistant perforated plates disposed in spaced relation within said sections with the lowermost plate in any one section being supported by the ring located between said section and the next lower section, a plurality of corrosion resistant clamps securing said lowermost plate to the ring to prevent axial displacement of the plates within the section, the peripheral edge of said plates being spaced out of contact with the glass coating covering the internal surfaces of said sections to provide a clearance therebetween, a corrosion resistant seal disposed within said clearance to prevent flow of liquid and gas therethrough, a tubular downcomer disposed within an opening in the plate and having the upper end thereof projecting a given distance above said plate and the lower end thereof extending downwardly toward the next succeeding lower plate, said downcomer serving to conduct liquid above a given level on said plate to the said lower plate, a series of pins engageable with each other in an end-to-end relation and disposed within aligned openings in said plates to thereby secure the plates in spaced relation to each other and prevent rotation thereof within the column sections.

7. In a liquid-gas contact apparatus, a tubular section, a series of sieve plates disposed in spaced relation within the section, a tubular downcomer extending between adjacent plates in the series for conducting liquid above a given level from each plate to the next succeeding lower plate, said downcomer disposed within an opening in one plate and having an open upper end projecting a given distance above said plate and the lower end of the downcomer extending downwardly toward the next succeeding lower plate, and a pair of arms disposed on the upper edge portion of the downcomer and extending outwardly from opposite sides of said downcomer and serving as a baffle member for the liquid layer on said plate.

8. In a liquid-gas contact apparatus, a tubular section, a series of sieve plates disposed in spaced relation within the section, a tubular downcomer extending between adjacent plates in the series for conducting liquid above a given level from each plate to the next succeeding lower plate, said downcomer disposed within an opening in one plate and having an open upper end projecting a given distance above said plate and the lower end of the downcomer extending downwardly toward the next succeeding lower plate, and a pair of arms disposed on the upper edge portion of the downcomer and spaced above said first plate, said arms extending tangentially outward from substantially opposite portions of said downcomer and serving as baffling members for the liquid layer on said plate.

References Cited in the file of this patent

UNITED STATES PATENTS

| | | |
|---|---|---|
| 516,154 | Ellis | Mar. 6, 1894 |
| 1,424,173 | Lichtenthaeler | Aug. 1, 1922 |
| 1,467,583 | Lichtenthaeler | Sept. 11, 1923 |
| 1,643,696 | Campbell | Sept. 27, 1927 |
| 1,667,136 | Alexander | Apr. 24, 1928 |
| 1,711,656 | Risdon | May 7, 1929 |
| 1,736,845 | Chillas | Nov. 26, 1929 |
| 1,748,508 | Cooke | Feb. 25, 1930 |
| 1,897,766 | Primrose | Feb. 14, 1933 |
| 1,920,623 | Becker | Aug. 1, 1933 |
| 2,201,949 | Wentworth | May 21, 1940 |
| 2,241,114 | Brunjes | May 6, 1941 |
| 2,575,193 | Shire | Nov. 13, 1951 |

FOREIGN PATENTS

| | | |
|---|---|---|
| 647,647 | Great Britain | Dec. 20, 1950 |
| 719,292 | France | Nov. 14, 1931 |
| 762,985 | Great Britain | Dec. 5, 1956 |
| 787,370 | France | July 1, 1935 |
| 891,411 | France | Dec. 11, 1943 |